United States Patent [19]
Bonar

[11] 3,899,042
[45] Aug. 12, 1975

[54] AUTOMOBILE SEAT AUTOMATIC PASSENGER-SECURING DEVICE

[76] Inventor: George D. Bonar, 160 Bleecker St., New York, N.Y. 10012

[22] Filed: Apr. 29, 1974

[21] Appl. No.: 464,791

[52] U.S. Cl. ............ 180/82 C; 280/150 B; 297/390
[51] Int. Cl. ............................................ B60r 21/10
[58] Field of Search ............... 280/150 B; 296/65 A; 297/216, 384, 385, 390; 180/82 C

[56] References Cited
UNITED STATES PATENTS

| | | | |
|---|---|---|---|
| 3,545,789 | 12/1970 | Graham | 280/150 B |
| 3,759,343 | 9/1973 | Monaghan | 280/150 B |

*Primary Examiner*—Kenneth H. Betts

[57] ABSTRACT

In a preferred embodiment of the invention, there is provided an automatic apparatus mounted on the side of the back of an automobile seat and serves as a substitute for here-to-fore known seat belts, the present device having a pivoted arm extending downwardly and from the lower end thereof having a second arm extending forewardly beside the seat, and there also preferably being another downwardly extending arm on the other opposite edge of the back of the seat for concurrent pivoting upwardly when the first arm pivots upwardly, the upwardly pivoting arm being actuatable to pivot upwardly when the passenger sits down upon a seat of the automobile by virtue of the person leaning back against the back of the seat to thereby press a fluid filled compactible enclosure thereby actuating a release mechanism for the automatic pivoting upwardly of the downwardly extending arms, and when the downwardly extending arm pivots upwardly, which has the second arm transversely thereto. When the first arm is pivoted upwardly the second arm is extending vertically and promptly thereafter pivots downwardly in front of the seated person and automatically slides backwardly along the first arm in order to press the rearward face of the back side edge of the downwardly pivoted second arm in its horizontal state against the stomach or chest of the seated person thereby pinning that person snuggly against the seat, with the rearwardly slipped second arm becoming automatically locked in its most rearward position until release thereof by the pressing of a release botton.

13 Claims, 15 Drawing Figures

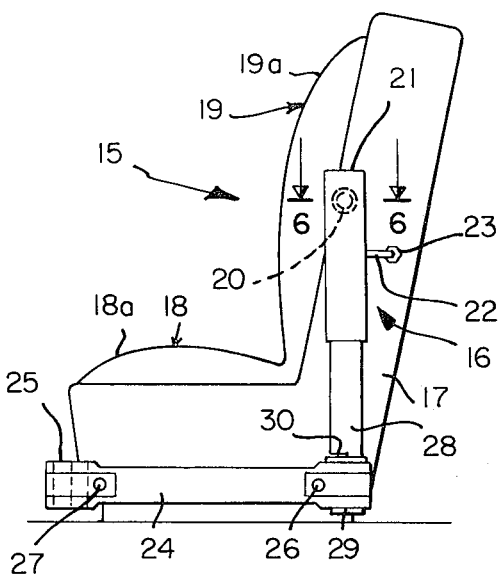
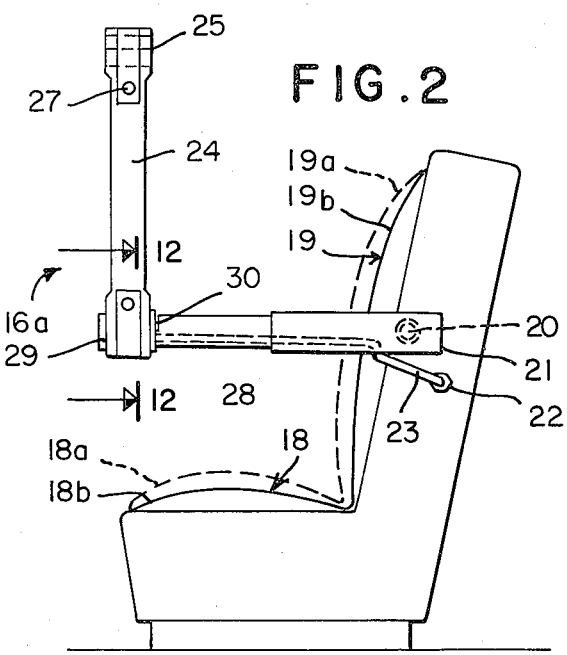
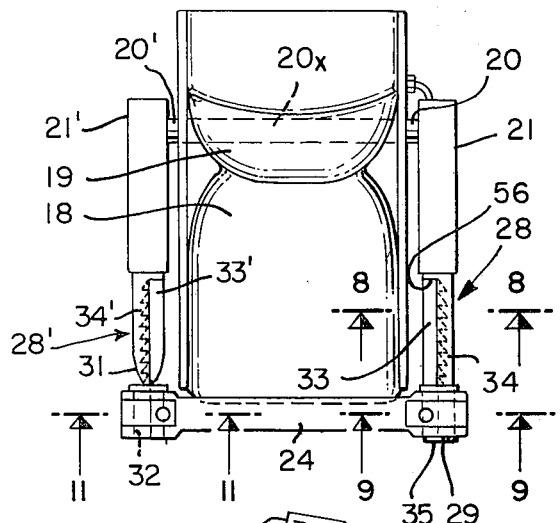
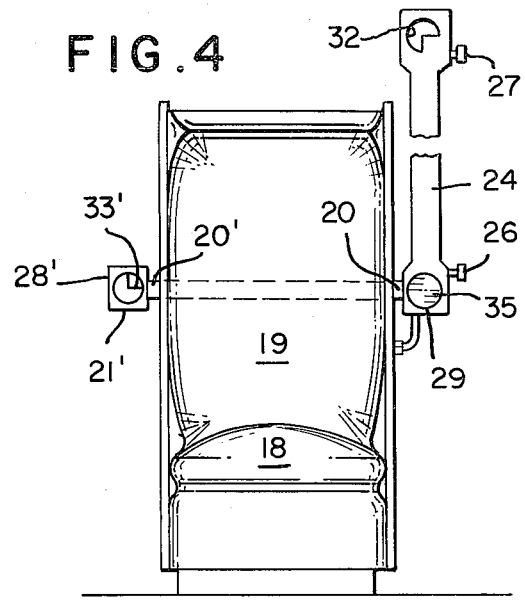
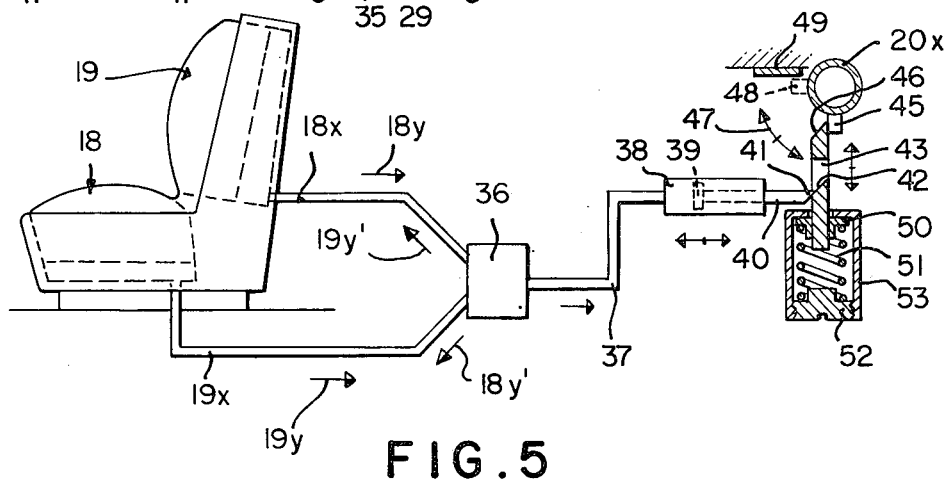

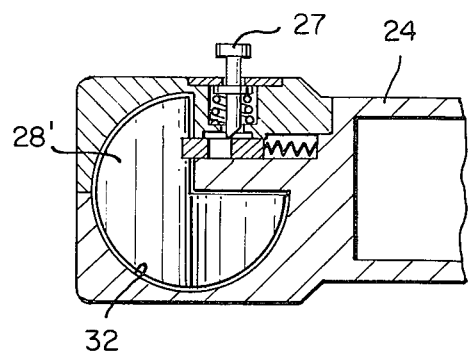
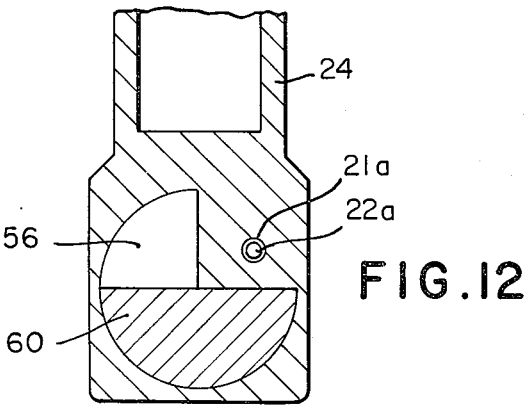
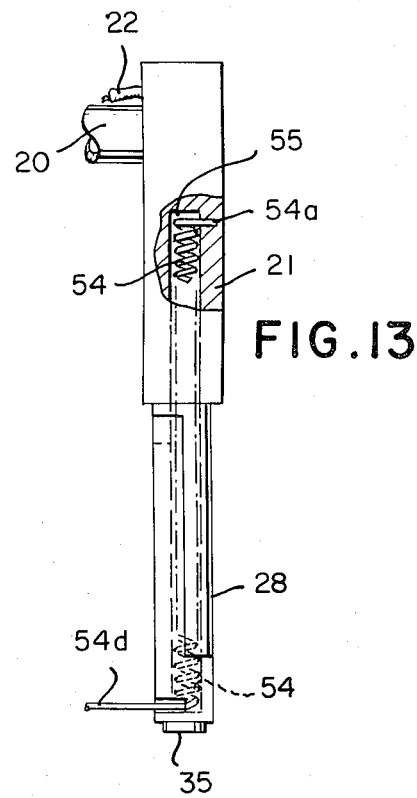
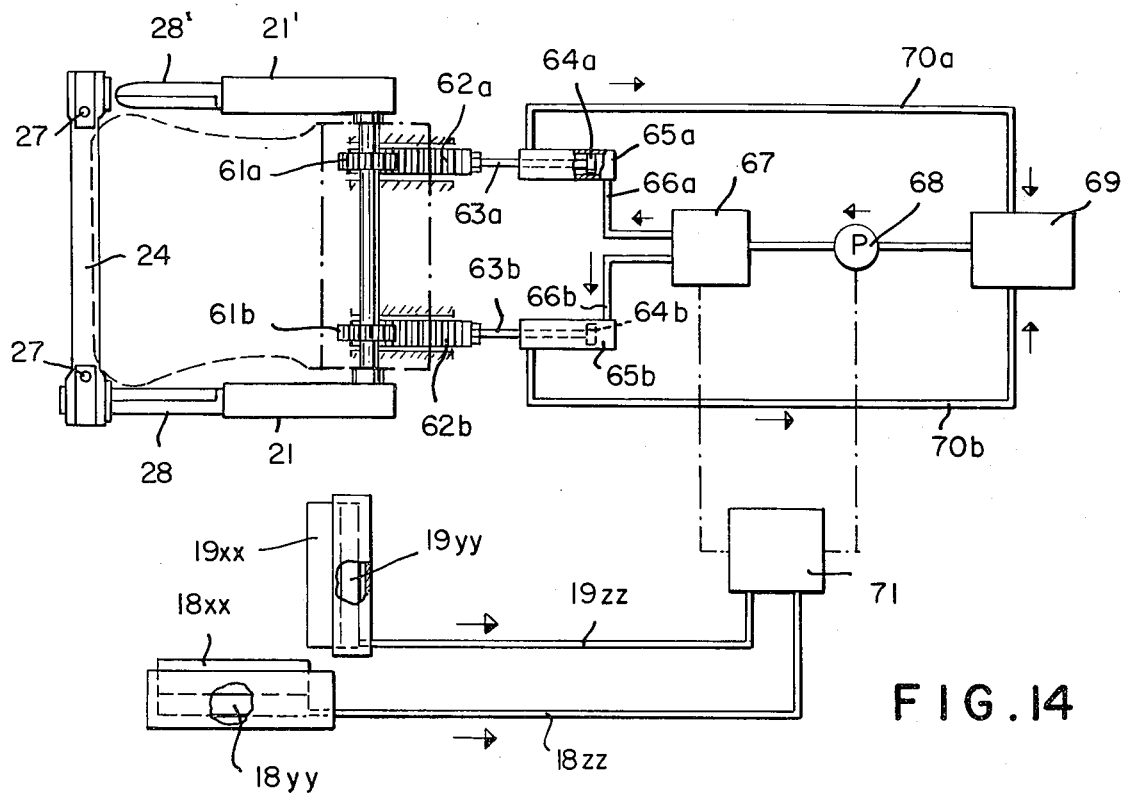

3,899,042

AUTOMOBILE SEAT AUTOMATIC PASSENGER-SECURING DEVICE

This invention is directed to a novel and improved substitute for the seat belt, for securing a passenger safely within the automobile seat automatically.

Prior to the present invention, there have existed numerous suggestions for effecting greater safety to the passengers riding within a motor vehicle, such as seat belts which originally merely were strung across the lap of the passenger, but in subsequently developed models which also included shoulder straps and the like, for preventing the passenger from being thrown forwardly. The latter type shoulder seat belts particularly when used in conjunction with the lap type seat belts are recognized as being especially desirable and provide a high degree of safety to the passenger utilizing such belts. However, human nature being what it is, most persons are too lazy or neglectful to be bothered with the time required for the latching of these more involved seat belts, most people even finding it too bothersome even to buckle on the more usual or more conventional type seat belt of the latter type mentioned above. Accordingly, even though the use of such seat belts may well resolve in the saving of the life of the person or in the prevention of major injury to him or her, people continually ride or drive without using the belts and as a result continue to be seriously injured or killed in the inevitable automobile accidents that occur.

Recognizing the failure of automobile drivers and/or passengers to utilize seat belts even when provided in the automobile, elaborate devices have been provided for preventing the turning off of the ignition of the automobile, or equivalent other safeguards, until such time as at least the driver's seat belt is properly fastened. For the same reason, there have been alternate methods of imposing safety upon the notoriously neglectful automobile driver and riders by legislation of a federal nature compelling the automobile companies to install in each automobile an appropriate safety feature such as a cushion bag of the type that explodes with the intensity of a hand grenade into the face and against the chest of the driver and any passenger within the front seat, and there presently being also such provisions for the seat in order to thereby pin the passenger and driver securely against the upright back of the seat on which the driver and/or passengers are seated. There are many disadvantages to such an arrangement. For example, such a device is released by virtue of sudden change of momentum such as when a driver suddenly jams on the brakes, with the result that even though the driver may continue to have full control of the automobile, the explosion of the device in his face forces his hands from the steering wheel, forcing the driver against the back of the seat while concurrently totally obscuring the vision of the driver and accordingly rendering the automobile totally out of control, to possibly cause an accident that could possibly have been avoided. Also the explosion produces such a loud noise that it is apt to frighten or frustrate any reasonably calm driver, much less a nervous driver in a critical or dangerous situation, particularly in situations which merely required a sudden application of the brakes to avoid danger — but which after the sudden braking results in an accident because of the explosive device.

SUMMARY OF THE INVENTION

Accordingly, objects of the present invention include the overcoming and avoiding of problems of the type discussed above and difficulties of the types discussed above, together with new and novel advantages.

More particularly, objects of the present invention include the providing of a substitute alternative device for the prior devices of the type discussed above, avoiding and/or overcoming one or more problems or difficulties of the type discussed above.

Another object of the present invention is to provide a securing device which automatically requires the passenger himself to bring about the securing thereof, thereby avoiding the necessity of the driver or passenger going through the motion of strapping himself or herself into the automobile seat and also thereby forcing upon the driver the practice of safety for his own good and for the good of others that could be injured as a result of himself or herself not being secured into the seat.

Another object is to provide such an apparatus which will securely anchor the driver or passenger into the seat without the possibility of allowing the driver's chest to be thrown forwardly against the steering wheel and/or against the windshield and without sudden noise or the like at the time of an impending accident or experience requiring the attention and accuracy of the driving by the driver, thereby avoiding possibility of causing an accident rather than preventing an accident with the automobile.

Another object is to provide a securing mechanism for anchoring comfortably the driver and/or passengers of the automobile or truck or the like rearwardly against the back to the seats on which he is seated adjustably, automatically, preferably irrespective of the degree to which a person is thin or fat, large or small in the stomach and/or chest area.

Another object is to provide securing structure in the nature of the type discussed above in the preceding object, while concurrently providing a high degree of strenght durable against high magnitudes of force and stress.

Another object is to obtain one or more of the preceding objects together obtaining such by simple and/or inexpensive structure and mode of operation and including a low cost of materials as well as low cost of manufacture.

Another object is to obtain a securing device of the type discussed above, of one or more of the preceding objects while achieving a device which is easily releasable and maneuverably by a person of the lowest magnitude of intelligence, thereby providing against accidental entrapment thereby.

Other objects become apparent from the preceding and following disclosure.

One or more objects of the present invention are obtained by the invention as described herein.

Broadly the invention may be defined as a device mountable on a support such as a seatback to an automobile seat, preferably the seat being of the type in which solely one passenger or driver is seatable at a time, the device being a structure mountable along the side or back of the seat and the device being extendable laterally from the seat-back side mounting point and pivotable downwardly from its mounting point, with the downwardly-pivoted arm having at its lower end a forwardly directed second arm. When the downwardly-pivoted arm swings horizontally upwardly, the forwardly extended arm thereby becomes supported uprightly immediately prior to the downward transverse pivoting of the second arm to a position in front of a seated person, the downwardly pivoted second arm being substantially horizontal and paralled to the front surface of the back of the seat, serving to pin the passenger between the second arm and the back of the seat. Immediately after the second arm pivots to the horizontal state, the second arm moves slidably toward the passenger.

Typically and preferably the actuation means for bringing about the upwardly pivoting of the first arm to the horizontal state and thereafter the pivoting of the second arm to its horizontal state and its sliding advancing toward the seated person are all automatic, preferably initiated by a hydraulic or pneumatic cushion and tube-conduits therefor for initiating release of a key when the cushion is sat or leaned on. By requiring both seat and back-of-seat cushions to be pressed to actuate, a safety feature thus presents premature actuation.

In particular preferred embodiments of the invention, there are provided spring-biasing mechanisms for each of the first arm upward pivoting, the second arm downward pivoting, and the second arm rearwardly advancing.

At the distal end of the first arm the second arm is mounted in a transverse axis to the actual axis of the first arm such that the second arm pivots downwardly in front of the seated person when the first arm is pivoted upwardly to a horizontal state, the second arm pivoting downwardly from a vertical position to a substantially horizontal state by virtue of a key which becomes released when the first arm reaches horizontal state thereby permitting the downwardly pivoting of second arm. In like manner, preferably when the second arm reaches the horizontal pivoted state there is an additional key mechanism which thereafter permits a third spring to press the second arm slanted forward toward the chest or stomach of the persons seated, the proximal end of the second arm sliding along longitudinal axis of the first arm. As the second arm slides advancingly toward the stomach or chest of the persons seated, a key will automatically lock as it goes forward by progressively each of the series of teeth until it becomes snug against the stomach or chest of the person, the distance depending on the fatness or thinness of the person, it will be locked against reverse force but may be released by the pressing of a button or pulling of a button or whatever the case may be. After release of the key, thereafter the second arm may be manually pushed in a reverse direction away from the stomach or chest of the person.

In like manner, when the key is released, permitting the second arm to be moved away from the stomach or chest, as soon as the second arm has been pushed all the way forwardly, it may then be pivoted upwardly into the retracted state and when the second arm is in the retracted vertical state and position, the first arm then after will pivot downwardly by manual pressure thereon.

In a further preferred embodiment of the invention, there is a second mounted downwardly pivoted arm on an opposite side of the back of the seat arranged and regulated to pivotly swing upwardly simultaneous and concurrent with the upper swing of the first pivot arm, and when the vertically extending second arm pivots downwardly into the horizontal state, its distal end becomes mateable with the distal end of this additional upwardly pivoting arm in order to totally enclose or circumscribe the upper portion of the body of the person seated securely in the seat. The benefit of this arrangement is to secure the clamping device against bending out of position at the time of a serious of forceful accident. Without this additional braking, there will be excessive leverage pressure on the arm if it were not braced by this additional element which serves to prevent such bending possibility.

The invention may be better understood by making reference to the Figures as follow.

THE FIGURES

FIG. 1 illustrates a side elevation view of a typical embodiment of a seat including as a part thereof mounting within and on the back thereof of an automatic safety arm body-clamp of the present invention. In this view, the arm connected to the seat back is shown in the state prior to activation.

FIG. 2 illustrates a second view in flow series from that of FIG. 1, also in side elevation side view illustrating the appearance of the body-clamp after the initial activation of the side arm swinging upwardly to a horizontal state, with the cross-arm still extending upwardly from the end of the side arm at this stage of activation, just before its automatic flipping downwardly to the FIG. 3 state.

FIG. 3 illustrates an elevation plan view of the embodiment of FIGS. 1 and 2, in flow series diagrammatically with FIG. 2 as the next position of the cross-arm after it has automatically flipped downwardly, immediately prior to its cross-arm sliding rearwardly toward the seat back.

FIG. 4 illustrates an elevation front view of the embodiment of FIGS. 1 through 3, in the FIG. 2 stage of activation and showing the arm in that same state but from a different view.

FIG. 5 illustrates a diagrammatic side view analogous to that of FIG. 4, except being merely diagrammatic and illustrating solely the mechanism of activation by fluid pressure and lever catches in a typical embodiment illustrated in the preceding Figures.

FIG. 11 illustrates a view as taken along line 11—11 in cross-section showing the preferred mechanism of the clamping arm in its horizontal state with regard to the terminal end thereof fastened onto the opposite side arm, and showing an end elevation view of that side arm.

FIG. 12 illustrates a cross-sectional view as typically taken along lines 12—12 of FIG. 2, illustrating the mechanism of rotary and locking movement thereof, of the vertically extending arm relative to the horizontally extending side arm of FIG. 2.

FIG. 13 illustrates in diagrammatic view the spring mechanism previously illustrated to some extent in FIGS. 9, 9A, and 10.

FIG. 14 illustrates an alternate embodiment of the present invention in which the mechanism is illustrated diagrammatically for a fluid actuated and electrical switch mechanism embodiment together wtih rotatable gears and ratchets for propelling the same for lowering opposite side arms.

DETAIL DESCRIPTION

Figure 6:
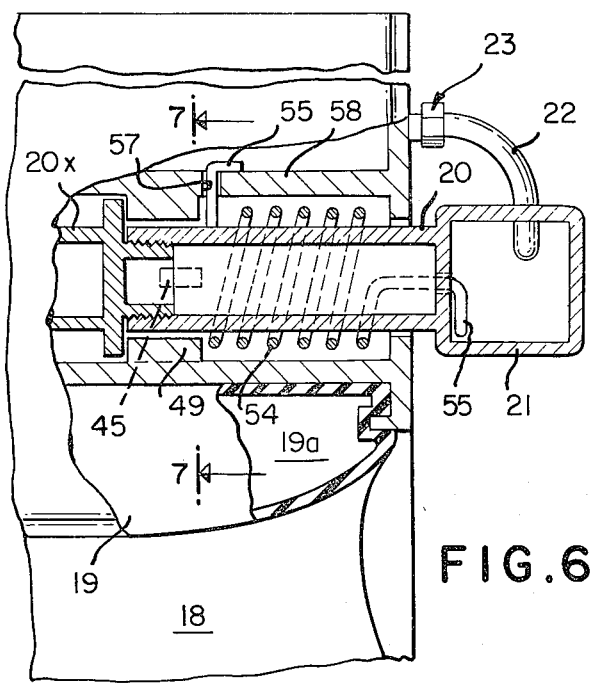
FIG. 6 illustrates an overhead cut-away view of the back of the seat and activation mechanism of the type illustrated in side view in FIG. 5 for a typical and preferred embodiment of the invention.

FIGS. 1 through 13 illustrates various views and in-part views and graphic illustrations of a preferred embodiment of the present invention, while FIG. 14 illustrates an alternate basically similar embodiment differing substantially only in the mechanism of actuation.

Thus, while this detailed description shall deal predominantly with the description of the invention in a consecutive-figures description, reference may be made to any of the various FIGS. 1 through 13 for the first embodiment and in FIG. 14 for the second embodiment, for better understanding of alternate views of the parts and functions being described for any other Figure. Elements and parts of similar functions but of an opposite arm, for example, of the safety seat embodiment, are identified by corresponding numbers differing in only one being a prime such as 21' as compared to 21.

In greater particularity, FIG. 1 illustrates the invention as embodied with a seat, the overall safety seat being preferred to as safety seat 15 typical of the type seal utilizable as an automobile front and/or back seat. It is apparent that as for example viewed in the FIGS. 3 and 4 illustrations that the seat is preferably of a width suitable for the seating solely one person, and accordingly in a conventional automobile there will be two side by side seats with respective arms on each side of each seat. However, it is contemplatable that where two seats are involved, a common arm may serve both left and right seats as an intermediate arm between two outside arms, single outside arm for each of the respective seats.

Thus, FIG. 1 discloses a safety seat 15 having built thereinto automatically actuatable clamping arm device 16, it being clearly contemplated with the scope of the invention to mount the device as a separate device detachably mountable onto any car seat by utilization of any desired appropriate mounting structure such as belts, bolts, and the like.

In the present embodiment, however, which is a preferred embodiment, the seat is a composite unit having the swing-arm 21 pivotally mounted on and intimate with rotatable shaft 20 for rotation therewith, relative to the stationary seat 17 whenever pressure is exerted concurrently on each of bottom seat cushion 18 and back-of-seat cushion 19, by a mechanism of a safety-nature as described in FIG. 5. In particular, the cushion 18 is in position 18a before it is sat upon and the cushion 19 is in position 19a before it is leaned upon by the back of the person. Continuous with the swing-arm 21, as a continuing distal end thereof there is the fixed and intermediate shaft element 28 which is the remainder of the arm rest but serves an intermediate function in the operation of the clamping mechanism.

The shaft 28 is inserted through the angularly opening 29 of the member 24, the member 24 being a cross-arm pivotable around the shaft 28 but locked or biased, or both locked and biased, in its rigid position as shown in FIG. 1 until such time as the arm 21 pivots upwardly such that shaft 28 is horizontal. The buttons 26 and 27 respectively are for releasing the cross-arm member 24 such that it is manually slidable axially along the shaft 28 and 28' respectively. The base 25 of the annulus at that end of the cross-arm member in the flipped-down horizontal state when the arm shaft 28 is in a horizontal state is aligned with the shaft 28' and threadable thereof as the cross-arm member moves toward the back of the seat automatically. Accordingly FIG. 2 illustrates in a flow-series further diagrammatic view the position of the arm 21 and the shaft 28 thereof in the horizontal upwardly pivoted state at which point the cross-arm member 24 is in the vertical state momentarily immediately prior to its automatically flipping downwardly to a horizontal state as shown for example in elevation plan view in the Figure illustration. In the FIG. 2 illustration, the position 18a in phantom and position 19a phantom illustrate the positions of FIG. 1 of the cushion threaded plug 52. However, fluid within the junction 36 does not flow in direction through conduit 37 unless each of cushions 18 and 19 are concurrently depressed or compressed because otherwise there is sufficient elasticity for expansion that the fluid being pressed from cushion 18 by depression thereof will flow in direction 19y' unless concurrently cushion 19 is depressed or compressed. Similarly, if in a situation such a person placing his hands on or against cushion 19 that cushion should be depressed, the fluid would flow in the direction 18y' until such time as the person sat down upon or concurrently pressed the cushion 18'. This feature of actuation constitutes the safety feature which prevents the clamping arm from being prematurely released to flip upwardly and get in the way or hit someone accidentally in the face or otherwise. The person sitting down need not worry about being immaturely clamped until such time as he leans back against the seat 19. Similarly, during the entering or exiting from an automobile it is not unusual for a person to place his hand on back of the seat in order to press the seat to gain balance to prevent himself from falling or the like thereof, whereby mere pressure on the back of the seat will not release the actuation mechanism described above. When both the cushions 18 and 19 are concurrently depressed, the withdrawal against the bias of spring 51 of the key 46 removes the key 46 from its locking position such that the projection 45 may swing by rotation by virtue of spring biasing or other mechanism of the shaft 20x to a position in which the projection 45 reaches position 48 against the stop-abutment 49 mounted on an interior portion of the seat for example.

FIG. 6 illustrates a view taken typically along lines 6—6 of FIG. 1 showing a partial cross-section there along of the seat 17, the cushion 18 thereof and the cushion 19 thereof in cross section. The mechanism of the biasing spring which biases the arm 21 to the horizontal position upon the release of the locking mechanism of the lock projection 25 is illustrated in FIG. 6 prior to the person sitting on the cushion 18 and leaning back on the cushion 19, the FIG. 2 illustration showing the positions after and during the state of being depressed by a person sitting on seat 18 to move it to position 18b by compressing thereof, and leaning backwardly against the cushion 19 to press it and depress it to position 19b.

FIG. 3 further illustrates the continuing shaft 20 as interior shaft 20x shown in phantom which exits on the other side as shaft 20′, and also illustrates recessed teeth 34 of shaft 28 and recessed teeth 34′ of shaft 28′ such that the lock key of the cross-arm in each end thereof will lock automatically in the respective teeth as in the arm member 24 moves toward the back of the seat 19 in which can be released only by the depressing of the keys 26 and 27 illustrated in FIG. 1. FIG. 3 further illustrates the next phase of the position automatically assumed after that position shown in FIG. 2. FIG. 4 illustrates the same position as that of FIG. 2 from a view as viewing FIG. 2 from left to right, immediately after which the arm 24 becomes automatically horizontally extended in the state as shown in FIG. 3.

FIG. 5 diagrammatically illustrates the fluid pressure mechanism of a preferred embodiment in which compression of cushion 18 causes fluid to flow through the conduit 19x in the direction 19y, and depression of the cushion 19 causes fluid to flow in direction of 18y through conduits 18x. Fluid junction 36 serve to channel (and possibly to be a point of adding fluid occasionally when additional fluid is needed) from the conduits 18x and 19x into the conduit 37 to the distal chamber 38 in order to press against a distal 39 to move axially a distal rod 40 having key 41 which when moved axially toward the lock key 46 causes the key 46 to move by virtue of pressure of key 41 against face 42 within space 43, causing the key 46 to move against the biasing spring 51 within its spring case 53 as supported by the Figure.

Figure 7:
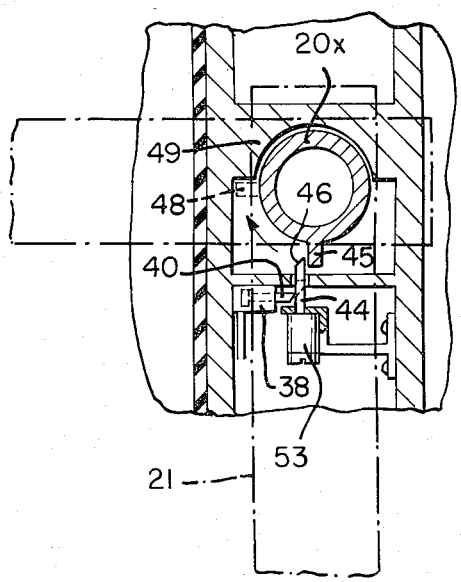
FIG. 7 illustrates a cross-sectional side view as taken along lines 7—7 of FIG. 6.

FIG. 7 illustrates a view as taken along lines 7—7 of FIG. 6 further illustrating the same mechanism as set forth in each of FIGS. 5 and 6. There is also shown in phantom in this Figure the position of the arm 21 in each of the downwardly-extending vertical position and the upwardly-pivoted horizontal state after release of the mechanism.

Figure 8:
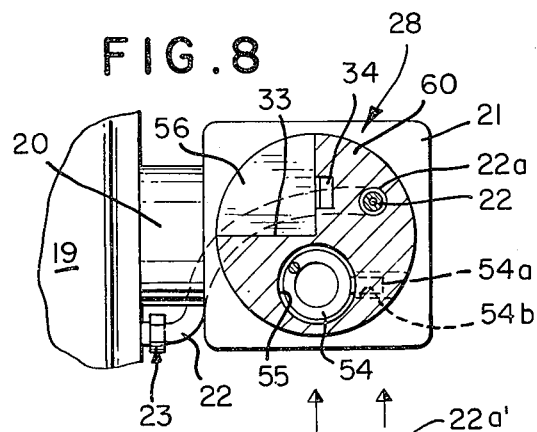
FIG. 8 illustrates a forward and in-part cross-sectional view of the arm in its horizontal state as taken along lines 8—8 of FIG. 3.

FIG. 8 illustrates a view as taken along lines 8—8 of FIG. 3, in an in-part view thereof to illustrate the position of a spring 54 within space 55, this spring 54 serving a multiple purpose, in being anchored by a spring end 54a within side aperture 54b within the body of structure 60 of shaft 28. There is also shown the passage 22a through which is channeled the anchoring cord 22 which is a part of the mechanism by which the cross-arm 24 is released from its vertical state as shown in FIG. 2 to flip down to the horizontal state as shown in FIG. 3. It is also illustrated in FIG. 8 that there is a cut-away quarter-section 33 which is also viewable in FIG. 3.

Figure 9:
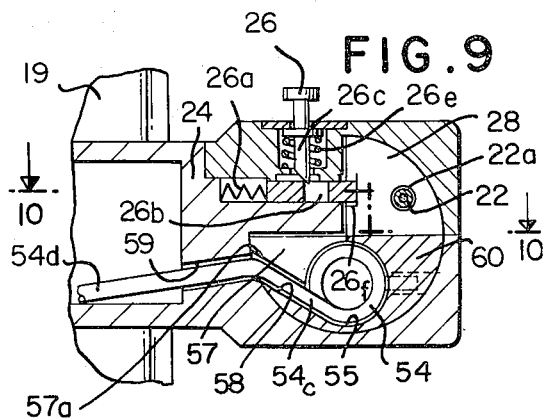
FIG. 9 illustrates a view analogous to that of FIG. 8 except taken through the downwardly turned arm in its horizontal state as illustrated in FIG. 3 as taken along lines 9—9 thereof.

FIG. 9 illustrates a cross-sectional view as taken along lines 9—9 of FIG. 3, illustrating an end view of the upper-half quarter-section of shaft 28 and the passage opening of passage 22a with an end view substantially of the anchor cord 22 in cross-section, and this view of FIG. 9 further disclosing the details of a mechanism of the release button 26 biased upwardly by spring 26e, shaft 26c having a flange intermediate thereof against which the spring biases, such that upon depression of the button 26, the horizontally extending seat is retracted as the shaft 26c is pressed into the space 26b above the key to become slidable biased against and in the direction of spring 26a. The spring 26a ordinarily biases the key into a locking position for engaging with the teeth 34 of shaft 28. The spring 54 is coiled tightly and in a stretched state such that it serves to twist the cross-arm member 24 into the horizontal position by virtue of the downwardly biasing spring end 54d mounted through aperture 59 such that it will flip the arm downwardly to that point but no further because of the abutting face 58 of the body 60 of shaft 28, the portion 54c of the spring being restrained in its downward movement by the face 58. Free-space 57 permits the downward-biasing of the spring portion 54c when the cross-arm member 24 is located at the distal end of the shaft 28. The slot 57a extends horizontal and axially down the body of the arm 28 such that the spring portion 54c may retract from its extended state to thereby drag with it the downwardly pivoted horizontally extending cross-arm member 24.

Figure 9A:
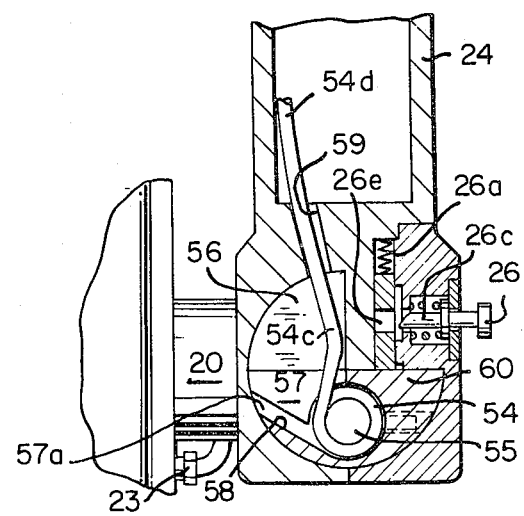
FIG. 9A illustrates a view somewhat analogous to that of FIG. 9 in partial cross-section, the position of the arm and the activating spring which flips-downwardly the cross-arm also being partially shown.

FIG. 9A illustrates the same view as that of FIG. 9 except before the flipping out-downwardly pivotably of the arm 24, the FIG. 9A corresponding to the position shown in each of FIGS. 2 and 4, while the position shown in FIG. 9 corresponds to that of FIG. 3. The end-face of the shaft 28 is identified in each of FIGS. 3, 4 and 10 as shaft 28 and 35.

Figure 10:
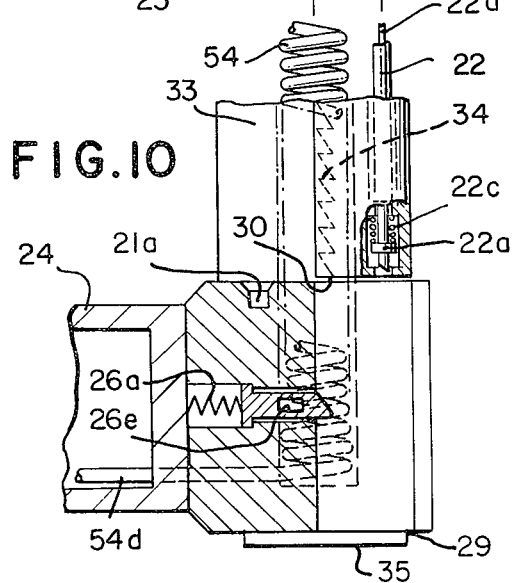
FIG. 10 illustrates an elevation plan view taken in in-part view and in partial cross-section illustrating the relationship and mechanism of the interconnecting joint between the two arms.

The view of FIG. 10 is as taken along lines 10—10 of FIG. 9.

FIG. 11 illustrates in a view taken along line 11—11 of FIG. 3, illustrating in greater details the functional relationships and locations and mechanism of the distal end of the arm 24 together with the corresponding similarly operating release button 27 and mechanism thereof.

FIG. 12 illustrates a view as taken along lines 12—12 of the FIG. 2 illustration showing in cross-section a manner in which the anchor cord 22 serves to extend into a space or apertures 21a of the cross-arm 24 to lock that cross-arm member in its vertical position until such time as the anchor key 22a attached fixably to the anchor cord 22 flexible axially-mounted wire 22a′ becomes pulled into a withdrawn state against the biasing action of spring 22c. The wire 22a′ is pulled in order to retract the member 22a as shown in FIG. 10, by virtue of the wire 22a′ being anchoring structure 23 to the seat 17 of FIG. 1, the location of anchoring being critical, with regard to being spaced away from and rearward to the pivoting axis 20 and the arm 21 such that as the arm 21 pivots upwardly the cord 22 is stretched to an extent that the wire 22a′ will not permit the key 22a to extend all the way to and through the aperture 21a of cross-arm member 24, whereby when the arm 21 and shaft 28 reach the horizontal pivoted state, the lock key 22a has been pulled by the wire 22a′ to its retracted state whereby at such time the downwardly spring-biased cross-arm member 24 by virtue of downwardly pivoting springs portion 54d pivots downwardly to its horizontal state as shown in FIG. 10. This Figure also shows the direction in which the wire 22a′ is pulled when the arm 21 becomes pivoted upwardly to the horizontal state and additionally also shows the direction in which the spring is stretched in order to cause the arm to 24 to be pulled inwardly towards the seat back 19 when the spring portion 54c is aligned with the groove 57a.

The FIG. 13 further shows the anchoring of the spring end 54a of the stretched spring 54 shown in its extended state immediate prior to withdrawing the portion 54d toward the retracted state in the direction of the rod 20 (i.e. in the direction of the seat back 19).

FIG. 14 illustrates an alternate embodiment. In particular, there are cushions 18xx and 19xx mounted over fluid spaces 18yy and 19yy respectively for forcing fluid through the conduits 18zz and 19zz respectively into the fluid and electrical switch junction 71 of a conventional source or as otherwise desired. The fluid pressure 71 serves to activate an electrical switch which when actuated turns on pump 68 to pump pressure into the respective cylinder 65a and 65b by the respective conduits such as the conduits 66a to move piston 64a typically and thereby move axially the shaft 63a and thereby move ratchet 62a in order to rotate the gear 61a to raise pivotably the arms 21' and/or 21 to the horizontal states as illustrated in this Figure until such time as back-pressure typically actuates a turn-off switch electrically leading to the electrical switch-fluid conventional structure 71, merely graphically illustrated in these Figures, such mechanism and device being well known within the conventional art. Typically source 69 provides adequate fluid for pressure. Released of pressure on the cushions 18xx and 19xx relieves pressure of the fluid within the spaces 18yy and 19yy respectively such that the conduits such as 18zz and 19zz are relieved of pressure which thereby cause the switch mechanism of units 71 to reverse the direction of pumping for pump 68 to thereby retract the ratchets 62a and 62b and accordingly revolve the gears 61a and 61 b in an opposite direction to lower the arms 21 and 21' respectively.

The conduits 70a and 70b represent the return conduits for cyclic flow for the functioning as described above.

It is within the scope of the present invention to make such variation and modification as would be apparent to a person with ordinary skill in this particular art.

I claim:

1. An automotive vehicle-seat passenger-securing device comprising in combination: a mounting structure for pivotably mounting thereon an elongated arm; first pivotable mounting means mounted on the mounting structure and providing for controlled intermittent pivoting to and fro on the mounting means, of an elongated arm means between withdrawn and extended locked states and positions; said arm means including a first elongated arm means pivotably and controllably mounted by the mounting means on the mounting structure; a second elongated arm means mounted at about a distal end of the first elongated arm means and pivotably along a plane substantially transverse and normal to an axial longitudinal axis of the first elongated arm means, the second elongated arm means including lock-release structure such that a distal end of the second elongated arm means is pivotable downwardly to a substantially horizontal state from an upright position whenever the first elongated arm means is positioned in an extended state and position extending substantially horizontally in a horizontal state.

2. An automotive vehicle-seat passenger-securing device of claim 1, and actuation means for sequentially unlocking the first and second elongated arm means from their respective retracted states and positions and for resetting the same in the retracted states and positions.

3. An automotive vehicle-seat passenger-securing device of claim 2, and the first pivotable mounting means including structure providing for first automatic pivotal extension of the first elongated arm means from the retracted to the extended horizontal state and position thereof upon initiation of the actuation means.

4. An automotive vehicle-seat passenger-securing device of claim 3, and a second pivotable mounting means including structure providing for second automatic pivotal extension of the second elongated arm means from its vertical to horizontal states and positions thereof whenever the first elongated arm becomes extended to the horizontal state.

5. An automotive vehicle-seat passenger-securing device of claim 4, in which the structure of the first and the second pivotal mounting means for the first and second automatic extensions each comprises a spring in a biasing state when the first elongated arm means is in the retracted state and position, and when the second elongated arm means is in the vertical retracted state and position.

6. An automotive vehicle-seat passenger-securing device of claim 5, in which the activation means includes a compressible container having fluid therein and conduit structure leading therefrom to and including a fluid operated release-key structure such that when the weight of a person presses against the fluid enclosure, the key releases the first pivotable mounting means permitting the automatic extension of the first elongated arm means.

7. An automotive vehicle-seat passenger-securing device of claim 6, and securing means for securing snugly a person between an upright seat-back and a rearward face of the second elongated arm means when the second elongated arm means is in a horizontal extended state and position, providing for rearward advancement of the second elongated arm means along an axial axis of the first elongated arm means.

8. An automotive vehicle-seat passenger-securing device of claim 7, in which the securing means comprises the first elongated arm means including slide structure extending axially from its distal end toward its proximal end and includes a key structure extending transversely to the axially extendinding first elongated arm means and the second elongated arm means including at its pivotal proximal end slidable mounting structure and a key-receiving passage extending in alignment with the key structure when the second elongated arm means is in an extended state and position such that the second elongated arm is slidable rearwardly automatically when it becomes automatically pivoted to a horizontal state and position.

9. An automotive vehicle-seat passenger-securing device of claim 8, in which the securing means further includes a biasing spring biasing the second elongated arm means in a rearward direction.

10. An automotive vehicle-seat passenger-securing device of claim 9, in which the actuation means further includes locking structure mateably coordinated on each of the first and second elongated arm means and a release key, such that as the second elongated arm means is automatically advanced rearwardly it sequentially becomes locked against a force in an opposite direction to movement rearwardly and such that when a person is snugly secured by the rearwardly advanced second elongated arm the rearwardly locked second elongated arm means is releasable by manual pressing of the release key thereby allowing the second elongated arm means to be pushed away from the securing state and position to a distal end of the first elongated arm means at which point the second elongated arm means is pivotable upwardly manually and when the second elongated arm means is pivoted upwardly such that the first elongated arm means may be manually returned to a downwardly pivoted retracted state where it becomes catch-locked at the retracted state and position thereof.

11. An automotive vehicle-seat passenger-securing device of claim 10, including a second pivotable mounting means mounted on the mounting structure at a position spaced laterally along the mounting structure and providing for controlled intermittent pivoting to and fro on the mounting means, of another downwardly extending elongated arm, and a third elongated arm means pivotably and controlably mounted by the second pivotable mounting means on the mounting structure simultaneous with the pivoting to and fro of the first elongated arm means, and the third elongated arm means including receiving and lock structure and slide structure such that when the second elongated arm means pivots to an extended horizontal state, a distal end thereof of the second elongated arm means becomes lockably slidably secured onto said third elongated arm means, the second elongated arm means' distal end being shaped to mateably lock and slide rearwardly along an axial axis of the third elongated arm means securably lockable against force in an opposite direction to the rearward movement of the second elongated arm means, and including a mechanism for manual release of the locked state of the second elongated arm means to the third elongated arm means at such time that a person releases the release key of the second elongated arm means.

12. An automotive vehicle-seat passenger-securing device of claim 1, and securing means for securing snugly a person between an upright seat-back and a rearward face of the second elongated arm means when the second elongated arm means is in a horizontal extended state and position, providing for rearward advancement of the second elongated arm means along an axial axis of the first elongated arm means.

13. An automotive vehicle-seat passenger-securing device of claim 1, in which the actuation means further includes locking structure mateably coordinated on each of the first and second elongated arm means and a release key, so that as the second elongated arm means is automatically advance rearwardly it sequentially becomes locked against a force in an opposite direction to movement rearward and such that when a person is snugly secured by the rearwardly advanced second elongated arm the rearwardly locked second elongated arm means is releasable by manual pressing of the release key thereby allowing the second elongated arm means to be pushed away from the securing state and position to a distal end of the first elongated arm means at which point the second elongated arm means is pivotable upwardly manually and when the second arm means is pivoted upwardly such that the first elongated arm means may be manually returned to a downwardly pivoted retracted state and position thereof.

* * * * *